United States Patent
Branson et al.

(10) Patent No.: US 9,532,166 B2
(45) Date of Patent: Dec. 27, 2016

(54) TRANSACTION BASED TEMPORARY AND SECURE ACCESS

(71) Applicant: International Business Machines Corporation, Armonk, NY (US)

(72) Inventors: Michael J. Branson, Rochester, MN (US); Gregory R. Hintermeister, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1 day.

(21) Appl. No.: 14/453,239

(22) Filed: Aug. 6, 2014

(65) Prior Publication Data

US 2016/0044449 A1 Feb. 11, 2016

(51) Int. Cl.
*H04W 24/00* (2009.01)
*H04W 4/02* (2009.01)
*G06Q 10/08* (2012.01)
*H04W 12/06* (2009.01)

(52) U.S. Cl.
CPC ........ *H04W 4/02* (2013.01); *G06Q 10/0833* (2013.01); *G06Q 10/08355* (2013.01); *H04W 4/021* (2013.01); *H04W 4/026* (2013.01); *H04W 12/06* (2013.01)

(58) Field of Classification Search
CPC .................................................... H04W 64/00
USPC ................................ 455/456.1, 414.2, 404.2
See application file for complete search history.

(56) References Cited

U.S. PATENT DOCUMENTS

| | | | |
|---|---|---|---|
| 6,873,851 B2 | 3/2005 | Brown et al. | |
| 8,064,930 B2 | 11/2011 | Enzmann et al. | |
| 8,126,477 B2 | 2/2012 | Dravida et al. | |
| 8,144,640 B2 | 3/2012 | Bims | |
| 8,213,957 B2 | 7/2012 | Bull et al. | |
| 2010/0293106 A1 | 11/2010 | Rhoads et al. | |

(Continued)

FOREIGN PATENT DOCUMENTS

| | | | |
|---|---|---|---|
| EP | 1686829 A2 | 8/2006 | |
| EP | 2386878 A1 | 11/2011 | |

(Continued)

OTHER PUBLICATIONS

List of IBM Patents or Patent Applications Treated as Related.
(Continued)

*Primary Examiner* — Chuck Huynh
(74) *Attorney, Agent, or Firm* — Matthew J. Bussan

(57) ABSTRACT

A system includes a location tracking services server (LTSS) in communication with a location owner device. A tracking packet is sent from the location owner device to the LTSS. The tracking packet includes a unique transaction identifier that uniquely identifies the tracking packet as being associated with a transaction between the location owner and a location consumer. The LTSS sends to the location owner device a link that points to the tracking packet. The location owner device uses the link to send to the LTSS information (e.g., a GPS ID) that uniquely identifies a device associated with a location provider selected to fulfill the transaction. This information is used to update the tracking packet. The LTSS provides access for a temporary period defined by the tracking packet to location data that enables the location consumer device to display the geographical location of the device associated with the selected location provider.

10 Claims, 6 Drawing Sheets

(56) References Cited

U.S. PATENT DOCUMENTS

| | | | |
|---|---|---|---|
| 2011/0306366 A1 | 12/2011 | Trussel et al. | |
| 2012/0052843 A1 | 3/2012 | Enzmann et al. | |
| 2012/0270559 A1 | 10/2012 | Ingerson | |
| 2013/0016009 A1 | 1/2013 | Godfrey et al. | |
| 2013/0226453 A1 | 8/2013 | Trussel et al. | |
| 2013/0246301 A1* | 9/2013 | Radhakrishnan | G06Q 30/0282 705/347 |

FOREIGN PATENT DOCUMENTS

| | | |
|---|---|---|
| WO | 2013103978 A2 | 7/2013 |
| WO | 2013103978 A8 | 7/2013 |

OTHER PUBLICATIONS

U.S. Appl. No. 14/522,544, to Branson et al., entitled "Transaction Based Temporary and Secure Access", filed Oct. 23, 2014, assigned to International Business Machines Corporation.

"Glympse Now Available in New Windows(R) Marketplace for Mobile", printed from <http://www.glympse.com/news/press/2> on Jun. 3, 2014, 3 pages.

"Uber; Sharing Experiences: Have More Fun with the People Who Matter Most; Reliable Pickups", printed from <https://www.uber.com/> on Jul. 28, 2014, 5 pages.

\* cited by examiner

TRANSACTION BASED TEMPORARY AND SECURE ACCESS

BACKGROUND

The present invention relates in general to the data processing field. More particularly, the present invention relates to a method, apparatus and computer program product for temporarily and securely sharing location information of a mobile electronic device associated with a location provider selected by a location owner to fulfill a transaction between the location owner and a location consumer.

SUMMARY

In accordance with some embodiments of the present invention, a system includes a location tracking services server (LTSS) in communication with an electronic device associated with a location owner. A tracking packet is sent from the electronic device associated with the location owner to the LTSS. The tracking packet includes a unique transaction identifier that uniquely identifies the tracking packet as being associated with a transaction between the location owner and a location consumer. The LTSS sends to the electronic device associated with location owner a link that points to the tracking packet. The electronic device associated with location owner uses the link to send to the LTSS information (e.g., a GPS ID, a cellular phone identifier, etc.) that uniquely identifies an electronic device associated with a location provider selected by the location owner to fulfill the transaction. This information is used by the LTSS to update the tracking packet. The LTSS provides access for a temporary period defined by the tracking packet to location data that enables the electronic device associated with the location consumer to display the geographical location of the electronic device associated with the selected location provider.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
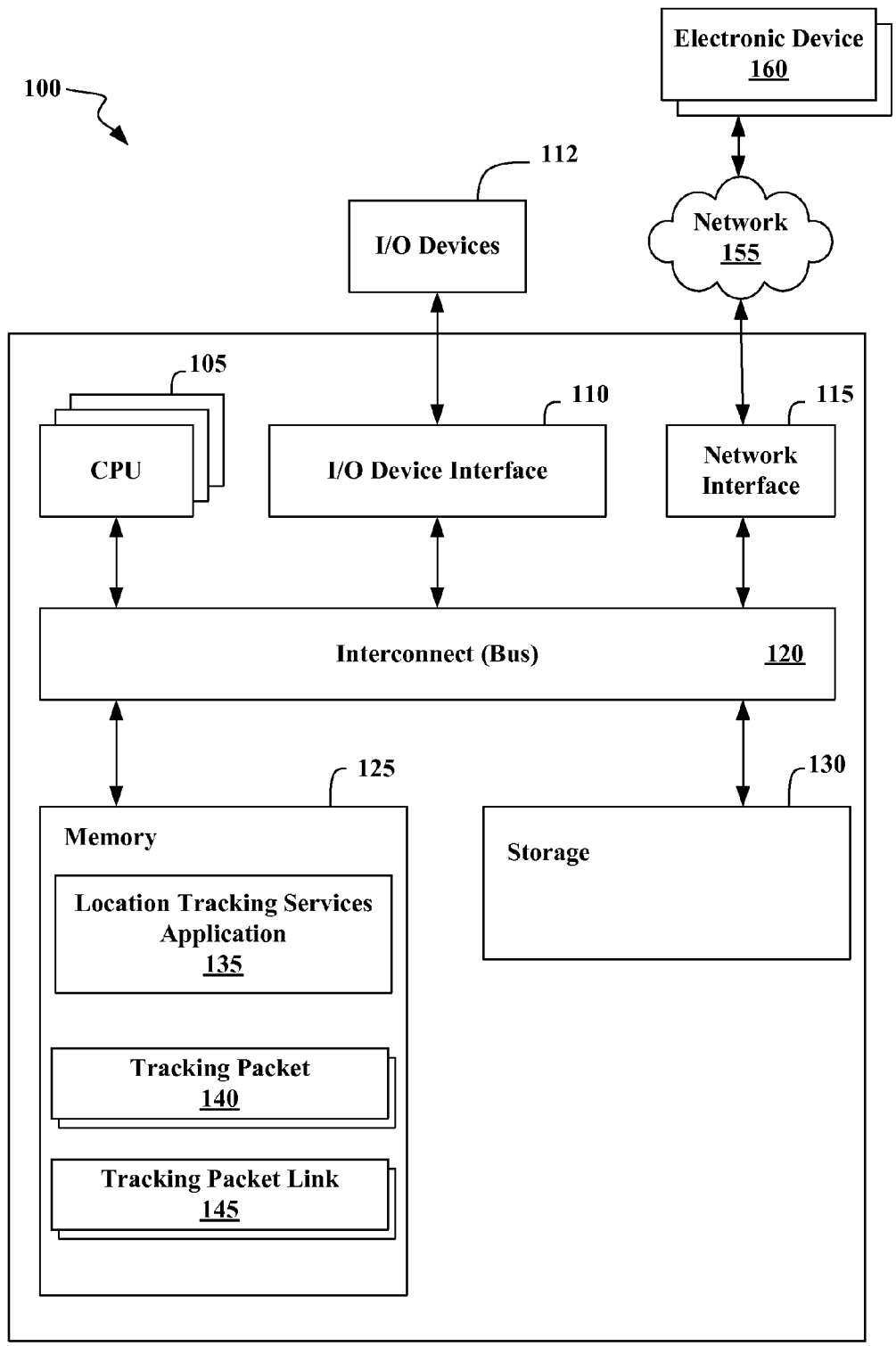
FIG. 1 illustrates an exemplary representation of a computer system connected to one or more electronic devices via a network for temporarily and securely tracking the location of a mobile electronic device in accordance with some embodiments of the present invention.

In accordance with some embodiments of the present invention, temporary access is granted to a location consumer (e.g., a customer who ordered a product from a goods or services provider for delivery) to track the real-time location of a mobile electronic device associated with a location provider (e.g., a delivery person) selected by a location owner (e.g., one or more employees of the goods or services provider) to fulfill a transaction between the location owner and the location consumer. In accordance with some embodiments of the present invention, the assignment by the location owner of the location provider to fulfill the transaction is temporarily indeterminate during the transaction. In accordance with some embodiments of the present invention, the tracking can only be performed from an electronic device involved in the transaction. For example, in addition to employees of the goods or services provider, only the customer who ordered the product can track the delivery of his/her product.

A "transaction", in accordance with some embodiments of the present invention, involves two parties who are also referred to herein as a "location owner" (e.g. one or more employees of a goods or services provider who sold a product to a customer) and a "location consumer" (e.g., the customer who purchased the product). The mobile electronic device, in accordance with some embodiments of the present invention, is associated with a "location provider" assigned by the location owner to fulfill the transaction. In accordance with some embodiments of the present invention, the assignment of the location provider by the location owner to fulfill the transaction is temporarily indeterminate during the transaction because the location provider is selected from among a plurality of location providers by the location owner during the transaction. For example, employees of the goods or services provider may not know which one of the provider's delivery persons will be assigned to deliver the product until the product is ready for delivery (e.g., after a good has been prepared and boxed). In accordance with some embodiments of the present invention, the temporary period of the tracking may also be temporarily indeterminate during the transaction. For example, one of the goods or services provider's delivery persons may be assigned to deliver several products in any sequence to multiple customers during a single trip from the goods or services provider's place of business.

In accordance with some embodiments of the present invention, the location data sent to a specific location consumer may not indicate a precise location until the location provider selected by the location owner to fulfill the transaction is on his/her/its way to the specific location consumer. For example, if the selected location provider is not yet on his/her/its way to the specific location consumer (e.g., the selected location provider is on the way to a different location consumer), and the selected location provider is a certain distance (e.g., 5 miles) from the specific location consumer, the location data sent to the specific location consumer may merely indicate that the selected location provider is within that certain distance from the specific location consumer without giving away the exact location of the selected location provider. In this situation (i.e., the selected location provider is not yet on the way to the specific location consumer), for example, the location data sent to an electronic device associated with the specific location consumer may be radius data merely enabling a client-side application residing on that device to display a perimeter ring around the geographical location of the specific location consumer (e.g., showing that the selected location provider is 5 miles away without giving away the exact location of the selected location provider). Later, when the selected location provider is on his/her/its way to the specific location consumer, the location data sent to the specific location consumer may indicate the exact location of the selected location provider. In this situation (i.e., once the selected location provider is on the way to the specific location consumer), for example, the location data sent to the electronic device associated with the specific location consumer may be GPS coordinates enabling the client-side application residing on that device to display the exact location of the selected location provider.

A "tracking packet" is bundled with a phone conversation or text message, in accordance with some embodiments of the present invention, so that one phone (e.g., a smart phone carried by a customer who purchased the product) can have temporary access to track the location of a mobile phone (e.g., a smart phone carried by a product delivery person). In the following example, the two parties to a transaction are a location owner and a location consumer. The location owner assigns a location provider to fulfill the transaction. When a private transaction between the two parties is performed through a phone call or text, for example, a tracking packet may be paired with that transaction so that the location owner can subsequently update the tracking packet to identify an electronic device associated with the location provider subsequently assigned by the location owner to fulfill the transaction and so that the location consumer can track the real-time location of the location provider assigned to fulfill the transaction, until the location provider and the location consumer meet or until a predetermined time period has elapsed. In some embodiments, once the two locations merge, the access is revoked. In other embodiments, once a time period has elapsed, the access is revoked.

In accordance with some embodiments of the present invention, the tracking packet may additionally enable the location owner (and/or the location provider selected by the location owner to fulfill the transaction) to track the real-time location of the location consumer, until the location provider and the location consumer meet or until a predetermined time period has elapsed.

FIG. 1 illustrates an exemplary representation of a computer system 100 connected to one or more electronic devices 160 (e.g., one or more cell phones) via a network 155, in accordance with some embodiments. In accordance with some embodiments of the present invention, the computer system 100 may be representative of a location tracking services server to which one or more electronic devices 160, such as one or more cell phones, connect via the network 155 using a client-side location sharing application, described below, and/or a tracking packet link, described below. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a location tracking services application 135, one or more tracking packets 140, and one or more tracking packet links 145. Although these elements are illustrated as residing in the memory 125, any of the elements, or combinations thereof, may reside in the storage 130 or partially in the memory 125 and partially in the storage 130. The location tracking services application 135 has a set (at least one) of program modules that, in conjunction with client-side application 214 (shown in FIGS. 2 and 3) and/or client-side application 254 (shown in FIGS. 2 and 3), generally carry out the functions and/or methodologies of embodiments of the invention as described herein.

The network 155 may be any suitable network or combination of networks and may support any appropriate protocol suitable for communication of data and/or code to/from the server computer system 100 and the electronic device 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The electronic device 160 may include some or all of the hardware and software elements of the computer system 100 previously described. For the purposes of this disclosure, the electronic device 160 may represent practically any type of computer, computer system, or other programmable electronic device, including but not limited to, a client computer, a server computer, a portable computer, a handheld computer, an embedded controller, etc. For example, the one or more electronic devices 160 may include a cell phone carried by the location owner, a cell phone carried by the location provider, and/or a cell phone carried by the location consumer.

As shown, there may be one or more electronic devices 160 connected to the computer system 100 via the network 155. In some embodiments, an electronic device 160 sends a tracking packet 140 by network 155 to computer system 100. Subsequently, the computer system 100 sends a tracking packet link 145 by network 155 to the electronic device 160.

Figure 2:
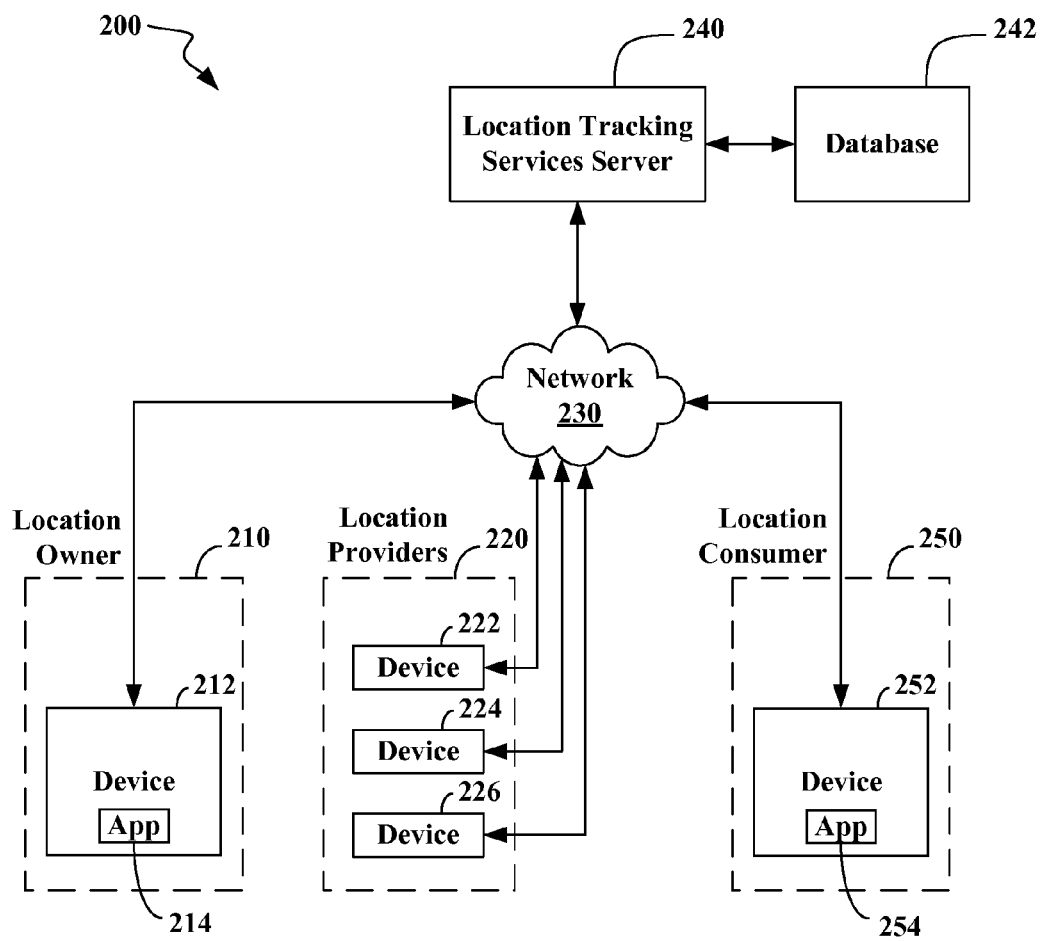
FIG. 2 illustrates an exemplary representation of a computer network system for temporarily and securely tracking the location of a mobile electronic device in accordance with some embodiments of the present invention.

Reference is now made to FIG. 2, which illustrates an exemplary representation of a computer network system 200 for temporarily and securely tracking the location of a mobile electronic device in accordance with an embodiment of the present invention. The computer network system 200 includes electronic devices 212, 222, 224, 226 and 252, such as cellular or mobile phones, personal computers or workstations, that are linked via a communication medium, such as a network 230 (e.g., the Internet) to an electronic device or system, such as a location tracking services server 240. The location tracking services server 240 may further be coupled, or otherwise have access, to a database 242 and/or a non-volatile storage (e.g., 130 in FIG. 1). The location tracking services server 240 may correspond to the computer system 100 illustrated in FIG. 1. Hence, the location tracking services application 135 (shown in FIG. 1 as residing in the memory 125 of the computer system 100) may reside in the location tracking services server 240.

The electronic devices 212, 222, 224, 226 and 252 may correspond to the one or more electronic devices 160 illustrate in FIG. 1. Likewise, the network 230 may correspond to the network 155 illustrated in FIG. 1. As illustrated in FIG. 2, the electronic device 212 is associated with a location owner 210. For example, the electronic device 212 may be a smart phone carried by the location owner 210. The location owner 210 is a human who (or a business or other entity that) is a party to a transaction with the location consumer 250, as well as any human who or computer system that engages in the transaction on behalf of that party. In this example, the location owner 210 may be one or more of a goods or services provider's personnel engaged in a transaction with a consumer involving the purchase of a product by the consumer from the provider's personnel and the delivery of the product to the consumer by one of the provider's delivery persons assigned to fulfill the transaction. As illustrated in FIG. 2, the electronic devices 222, 224 and 226 are respectively associated with three different location providers 220. Each of the location providers 220 is a human or computer system (e.g., autonomous car). In this example, the electronic devices 222, 224 and 226 may be smart phones respectively carried by three different delivery persons, any one of whom may be assigned to fulfill the transaction. As illustrated in FIG. 2, the electronic device 252 is associated with a location consumer 250. The location consumer 250 is a human who (or a business or other entity that) is a party to a transaction with the location owner 210, as well as any human who or computer system that engages in the transaction on behalf of that party. In this example, the electronic device 252 may be a smart phone carried by the location consumer 250, i.e., the consumer who purchased the product from one or more of the goods or services provider's personnel.

Although the embodiment illustrated in FIG. 2 includes three location providers 220 (i.e., the electronic devices 222, 224 and 226), one skilled in the art will appreciate that embodiments of the present invention may be implemented with any number of such location providers 220. The embodiment illustrated in FIG. 2 includes one location tracking services server 240 coupled to five electronic devices 212, 222, 224, 226 and 252 via the network 230. One skilled in the art will appreciate, however, that embodiments of the present invention may be implemented using any number of such electronic devices coupled to any number of such location tracking services servers. Moreover, the network 230 may include or otherwise be coupled to one or more telecommunication towers (not shown) that provide network connectivity to one or more cellular or mobile telephones.

In accordance with some embodiments of the present invention, each of the electronic devices 212, 222, 224, 226 and 252 may include all or fewer than all of the features associated with the computer system 100 illustrated in FIG. 1. Typically, the electronic devices 212, 222, 224, 226 and 252 include or are otherwise coupled to a computer screen or display (not shown). The electronic devices 212, 222, 224, 226 and 252 can be used for various purposes including both network-computing and local-computing processes.

In accordance with some embodiments of the present invention, each of the electronic devices 222, 224, 226 and 252 includes a global positioning system (GPS) receiver (not shown) that generates location information in the form of GPS data. Either conventional "push" or "pull" communication techniques may be used, in accordance with some embodiments of the present invention, to send the GPS data (or other location data derived from the GPS data) to the location tracking services server 240.

Figure 3:
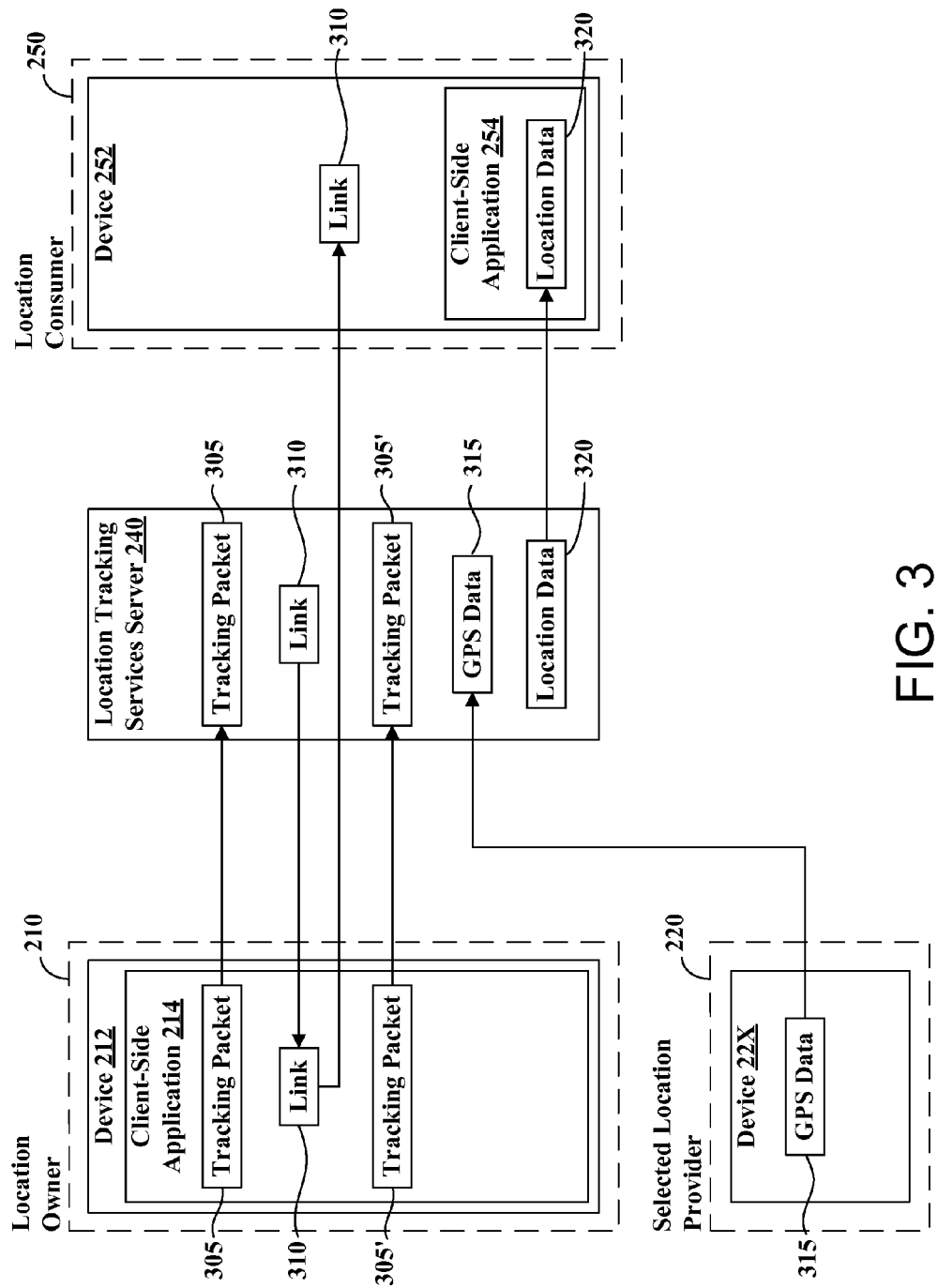
FIG. 3 illustrates an exemplary representation of data flow between components of the computer network system shown in FIG. 2 in accordance with some embodiments of the present invention.

The electronic devices 212, 222, 224, 226 and 252 are linked via the network 230 to location tracking services server 240 so that computer programs, such as, for example, a browser or other application, running on the electronic devices 212, 222, 224, 226 and 252 can cooperate in two-way communication with the location tracking services server 240. The location tracking services server 240 may be coupled to the database 242 and/or a non-volatile storage (e.g., 130 in FIG. 1) to retrieve information therefrom and to store information thereto. Moreover, and as best illustrated in FIG. 3, which illustrates an exemplary representation of data flow between components of the computer network system 200, the location tracking services server 240 may communicate with the electronic device 22X associated with the selected one of the location providers 220 and/or conventional GPS or triangulation systems in such manner as to allow the location tracking services server 240, using map data stored in the database 242, for example, to generate location data 320, such as, for example, HTML data, that may be used by a browser or other application (e.g., the client-side application 254) residing on the electronic device 252 associated with the location consumer 250 to display the location of the selected one of the location providers 220. The location of the location consumer 250 may be displayed as well.

The electronic device associated with the selected one of the location providers 220 (i.e., one of the electronic devices 222, 224 and 226 shown in FIG. 2) is denoted in FIG. 3 using the reference numeral "22X".

In addition, in accordance with some embodiments of the present invention, the location tracking services server 240 may communicate with the electronic device 252 associated with the location consumer 250 and/or conventional GPS or triangulation systems in such manner as to allow the location tracking services server 240, using map data stored in the database 242, for example, to generate location data, such as, for example, HTML data, that may be used by a browser or other application (e.g., the client-side application 214) residing on the electronic device 212 associated with the location owner 210 to display the location of the location consumer 250. The location of the selected one of the location providers 220 may be displayed as well.

Also, in accordance with some embodiments of the present invention, the location tracking services server 240 may communicate with the electronic device 252 associated with the location consumer 250 and/or conventional GPS or triangulation systems in such manner as to allow the location tracking services server 240, using map data stored in the database 242, for example, to generate location data, such as, for example, HTML data, that may be used by a browser or other application (not shown) residing on the electronic device 22X associated with the selected one of the location providers 220 to display the location of the location consumer 250. The location of the selected one of the location providers 220 may be displayed as well.

Figure 4:
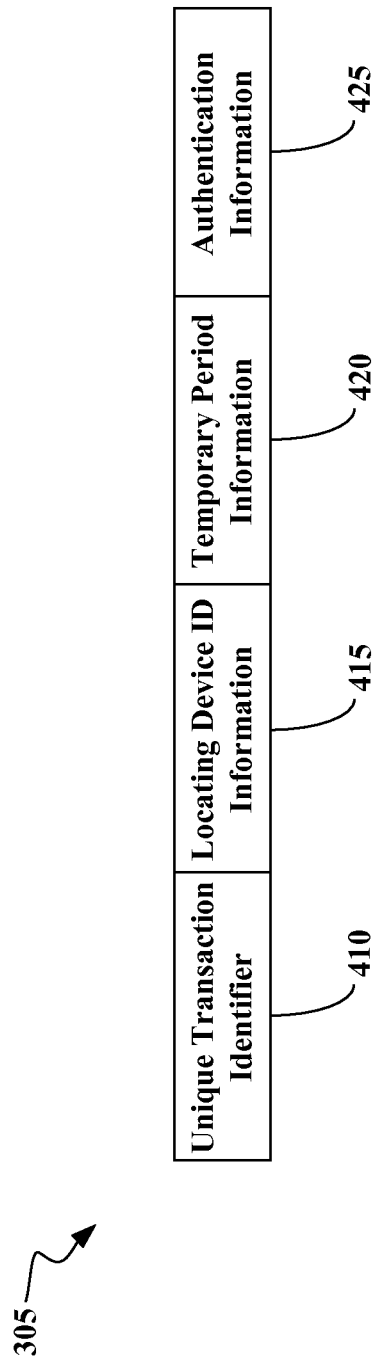
FIG. 4 illustrates an exemplary representation of a data structure for a tracking packet in accordance with some embodiments of the present invention.

Referring to FIGS. 2 and 3, an embodiment of the present invention includes a client-side application 214 executable on, for example, the electronic device 212 associated with the location owner 210. Upon a command of the location owner 210 or other user of the electronic device 212, the client-side application 214 is operable to create and send to the location tracking services server 240 a tracking packet 305. FIG. 4 illustrates an exemplary data structure of the tracking packet 305 in accordance with an embodiment of the present invention. The tracking packet 305 may correspond to one of the tracking packets 140 shown in FIG. 1.

The tracking packet 305 includes fields to accommodate a unique transaction identifier, locating device identifier information, temporary period information, and authentication information. Not all of the fields of the tracking packet 305 may contain complete data when the tracking packet 305 is initially sent to the location tracking services server 240. For example, when the tracking packet 305 is initially sent to the location tracking services server 240 the field to accommodate the locating device identifier information may not contain data because the location owner 210 may not have yet selected one of the location providers 220 to fulfill the transaction and, thus, the locating device identifier information about the selected one of the location providers 220 is temporarily indeterminate.

Hence, in accordance with some embodiments of the present invention, the selection of the location provider 220 has not yet occurred when the tracking packet 305 is created and sent to the location tracking services server 240 (i.e., the location owner 210 has not yet selected which of the location providers 220 will fulfill the transaction). Accordingly, the client-side application 214 is operable, upon command of the location owner 210 or other user of the electronic device 212, to update the tracking packet 305 to include locating device identifier information about the selected one of the location providers 220.

Also, when the tracking packet 305 is initially sent to the location tracking services server 240 the field to accommodate the temporary period information may contain no or incomplete data because the temporary period information may be temporarily indeterminate, e.g., a single location provider may be assigned to fulfill multiple transactions in any sequence, chosen on-the-fly at the location provider's discretion, during a single trip. Accordingly, the client-side application 214 is operable, upon command of the location owner 210 or other user of the electronic device 212, to update the tracking packet 305 with respect to the temporary period information.

Referring now temporarily to FIG. 4, which illustrates an exemplary data structure of a tracking packet in accordance with some embodiments of the present invention, the tracking packet 305 may, for example, include a unique transaction identifier field 410, a locating device identifier information field 415, a temporary period information field 420, and an authentication information field 425.

The unique transaction identifier field 410 of the tracking packet 305 may, for example, contain a unique transaction identifier (e.g., a numeric or alphanumeric string) that uniquely identifies the tracking packet 305 as being associated with a particular transaction between the location owner and the location consumer. The unique transaction identifier, which is generated by the client-side application 214, distinguishes the tracking packet 305 from all other tracking packets contained within the location tracking services server 240. The unique transaction identifier may be, for example, a numeric or alphanumeric string that includes a portion that uniquely identifies the location owner 210 (e.g., a client number that the location tracking services server 240 has assigned and communicated to the location owner 210) and a portion that uniquely identifies the transaction locally at the client-side application 214 (e.g., a transaction number that the client-side application 214 assigns to the transaction). For example, the portion of the unique transaction identifier that uniquely identifies the transaction locally may be a numeric or alphanumeric string generated by the client-side application 214 that serves to distinguish the transaction from other transactions to which the location owner is a party, and the portion of the unique transaction identifier that uniquely identifies the location owner may be a numeric or alphanumeric string assigned to the location owner by the location tracking services server 240 that serves to distinguish the location owner 210 from other location owners from which the location tracking services server 240 may receive tracking packets.

The locating device identifier information field 415 of the tracking packet 305 may, for example, contain GPS information about the selected one of the location providers 220. For example, the locating device identifier information field may contain a GPS ID that uniquely identifies the electronic device 22X associated with the selected one of the location providers 220 (i.e., one of the electronic devices 222, 224 and 226) and, optionally, the electronic device 252 associated with the location consumer 250. In this example, each of these electronic devices includes a GPS receiver that has a unique GPS ID. One skilled in the art will appreciate, however, that the locating device identifier information field of the tracking packet 305 may contain other location tracking information in addition to, or in lieu of, GPS information. For example, the locating device identifier information field may contain a cellular phone identifier employed by conventional triangulation systems that determine the location of a cellular phone through the use of the known location of one or more cell-towers and signal strength.

The temporary period information field 420 of the tracking packet 305 may, for example, contain temporary period information (e.g., start time, end time, length of time, and/or end-upon-meeting) that identifies a temporary period during which the user of the electronic device 252 (e.g., the purchaser of the product) may track the location of the selected one of the location providers 220.

The authentication information field 425 of the tracking packet 305 may, for example, contain data (e.g., phone number, caller ID, email address, a service subscriber's user name, etc.) that identifies a user of the electronic device 252 associated with the location consumer 250. The authentication information is used, in accordance with some embodiments of the present invention, to create authorization data that will allow the user of the electronic device 252 to track the location of the electronic device 22X associated with a subsequently selected one of the location providers 220 (i.e., one of the electronic devices 222, 224 and 226) and, consequently, track the selected one of the location providers 220. Hence, in accordance with some embodiments of the present invention, the authentication information field of the tracking packet 305 is used authenticate the temporary access to the location of the selected one of the location providers 220.

Referring now back to FIGS. 2 and 3, the client-side application 214 is configured to provide a user interface (not shown) displayable on the electronic device 212 associated with the location owner 210. The user interface functions to enable the user of the electronic device 212 (e.g., one or more employees of the goods or services provider) to select or otherwise input one or more values defining the locating device identifier information, the temporary period information, and the authentication information. As noted above, however, one or more of these values (e.g., one or more values defining the locating device identifier information and/or the temporary period information) may be temporarily indeterminate. These values, if available, are included in the tracking packet 305, along with the unique transaction identifier. In some embodiments, the unique transaction identifier is generated automatically by the client-side application 214. In other embodiments, the user of the electronic device 212 inputs the unique transaction identifier via the user interface. The tracking packet 305 is sent by the client-side application 214 to the location tracking services server 240. In accordance with some embodiments of the present invention, the tracking packet 305 may include one or more fields that do not contain data or that contain incomplete data.

In accordance with some embodiments, the selected location provider 22X uses the electronic device 212 to scan a barcode on a box containing a product that he/she is about to deliver (e.g., the barcode associates that box with a particular transaction) before heading out to deliver the product. The client-side application 214 then fills in the tracking packet 305 and initiates tracking for the location consumer 250 through the single barcode scan. For example, as described below, the client-side application 214 may use a tracking packet link 310 to send to the location tracking service server 240 a revised-version of the tracking packet 305 (i.e., a revised tracking packet 305') that replaces the original-version of the tracking packet 305. If the selected location provider 22X scans multiple barcodes respectively associated with multiple location consumers 250, the client-side application 214 may then prioritize based on the shortest route, provide the selected location provider 22X with turn-by-turn directions, and fill in the tracking packet 305 and initiate tracking for each of the multiple location consumers 250. The location data 320 sent to the electronic device 252 associated with the first one (first-up-for-delivery) of the multiple location consumers 250 may be GPS coordinates enabling display of the exact location of the selected location provider 22X, while the location data 320 sent to the electronic device 252 associated with each of the other multiple location consumers 250 may be radius data merely enabling display of a general perimeter ring (i.e., a circle surrounding the location of that location consumer 250, wherein the circle has a radius equal to the distance between the selected location provider 22X and that location consumer 250). Once the selected location provider 22X scans the barcode on the box at the first destination (i.e., the location of the first one of the multiple location consumers 250), the tracking period ends for that location consumer 250 (and the display on the electronic device 252 associated with the second one (second-up-for-delivery) of the multiple location consumers 250 changes from the general perimeter ring, discussed above, to pinpoint GPS tracking).

In response to receiving the tracking packet 305, the location tracking services server 240 returns a link 310 to the electronic device 212 associated with the location owner 210. The tracking packet link 310 can be used by the client-side application 214 to edit the tracking packet 305 and to track the selected one of the location providers 220. Only the electronic device 212 is allowed to edit the tracking packet 305. The tracking packet 305 must not be vulnerable to unauthorized editing by others.

When the link 310 is used to edit the tracking packet 305, in accordance with some embodiments of the present invention, the client-side application 214 is operable to send to the location tracking services server 240 a revised-version of the tracking packet 305 that includes the same unique transaction identifier as the original-version of the tracking packet 305. The revised version of the tracking packet 305 is denoted in FIG. 3 using the reference numeral "305'". For example, the location owner 210 may use the link 310 to edit the tracking packet 305 to reflect selection of one of the location providers 220 to fulfill the transaction and/or to update the temporary period information. The location tracking services server 240 may then verify the revised tracking packet 305'. For example, the location tracking services server 240 may verify that the entity seeking to edit the tracking packet 305 is indeed the electronic device 212 by verifying that the unique transaction identifier of the revised tracking packet 305' matches the unique transaction identifier of the original-version of the tracking packet 305. Verification of the authenticity of the revised tracking packet 305' prevents unauthorized editing of the tracking packet 305 by others. If the unique transaction identifiers match, the location tracking services server 240 replaces the original-version of the tracking packet 305 with the revised tracking packet 305'. If the unique transaction identifiers do not match, the location tracking services server 240 discards the revised tracking packet 305'.

One skilled in the art will appreciate that when the link 310 is used to edit the tracking packet 305, in accordance with other embodiments of the present invention, the client side application 214 need not send the revised tracking packet 305', in its entirety, to the location tracking services server 240. The client-side application 214 may instead only send to the location tracking services server 240 information relevant to editing the tracking packet 305. The location tracking services server 240 may then use this information to update the tracking packet 305 to incorporate changes, e.g., the locating device identifier information of the electronic device 22X associated with the selected one of the location providers 220 (i.e., one of electronic devices 222, 224 and 226) and/or the time at which the temporary period of tracking will commence.

The location owner 210 may edit the tracking packet 305 at any time using the tracking packet link 310. In accordance with some embodiments of the present invention, the location owner 210 uses the tracking packet link 210 to edit the tracking packet 305 to reflect the selection of one of the location providers 220 to fulfill the transaction and/or a change in the temporary period information. For example, the location owner 210 may utilize the tracking packet link 310 to access the tracking packet 305 stored in the location tracking services server 240, and then the location owner 210 may utilize the user interface provided by the client-side application 214 to generate the revised tracking packet 305' by selecting or otherwise inputting the locating device identifier information of the electronic device 22X associated with the selected one of the location providers 220 (i.e., one of electronic devices 222, 224 and 226) and/or the time at which the temporary period of tracking will commence.

In some embodiments, the user interface may be prepopulated with GPS IDs each associated with one of the location providers 220 so that the location owner 210 may input the locating device identifier information of the selected one of the location providers 220 merely by selecting the appropriate one of the location provider/GPS ID pairs. Alternatively, the location owner 210 may also manually type or otherwise input the GPS ID of the selected one of the location providers 220 into the user interface.

In other embodiments, the user interface may be prepopulated with cellular phone identifiers each associated with one of the location providers 220 so that the location owner 210 may input the locating device identifier information of the selected one of the location providers 220 merely by selecting the appropriate one of the location provider/cellular phone identifier pairs. Alternatively, the location owner 210 may also manually type or otherwise input the cellular phone identifier of the selected one of the location providers 220 into the user interface.

The link 310 is uniquely associated with the tracking packet 305. That is, the link 310 points exclusively to (the most-current version of) the tracking packet 305. For example, the location tracking services server 240 may assign a unique ID to each of the tracking packets that it receives and may incorporate the unique ID in the link 310. The unique ID may or may not be the unique transaction identifier of the tracking packet 305. When the user of the electronic device 252 (i.e., the location consumer 250) uses the link 310 to connect to the location tracking services server 240, the unique ID in the link 310 enables the location tracking services server 240 to match the link 310 to (the most-current version of) the tracking packet 305.

Upon receiving the link 310 from the location tracking services server 240, the electronic device 212 associated with the location owner 210 forwards the link 310 to the electronic device 252 associated with the location consumer 250. In accordance to some embodiments of the present invention, the link 310 may be sent to the electronic device 252 via SMS, email, or other suitable messaging format. The link 310 includes pointing data. This pointing data may incorporate, for example, a unique ID assigned by the location tracking services server 240 that points exclusively to the tracking packet 305. For example, the link 310 may be a selectable link to a URL from which the location data may be accessed. In addition, the link 310 may further include a default message or a customized message input by the user of the electronic device 212 (i.e., the location owner 210). For example, the link 310 may include a customized message in the form of an advertisement or a coupon offer input by the location owner 210.

In accordance with some embodiments, the link 310 is a selectable link to a URL, that, when selected by the user of the electronic device 252 (i.e., the location consumer 250), enables access to location coordinates provided by the location tracking services server 240. In these embodiments, the tracking interface is provided by the electronic device 252 associated with the location consumer 250. For example, the tracking interface may be provided by a client-side application 254 resident on the electronic device 252. The client-side application 254 may be, for example, a mapping application, such as Google Maps, resident on the electronic device 252. Such a mapping application may be utilized to provide a tracking interface and map the location coordinates provided by the location tracking services server 240 and, thereby, display the geographical location of the selected one of the location providers 220.

In accordance with other embodiments, the link 310 is a selectable link to a URL, that, when selected by the user of the electronic device 252 (i.e., the location consumer 250), enables access to a tracking interface provided by the location tracking services server 240. These other embodiments are advantageous in at least one respect—they merely require a conventional browser or the like be resident on the electronic device 252 to display the geographical location of the selected one of the location providers 220. In other words, these other embodiments are advantageous in that they do not require the installation of a specific client-side application (e.g., a mapping application) on the electronic device 252 to provide the tracking interface.

Irrespective of the entity that provides the tracking interface, if the user of the electronic device 252 (i.e., the location consumer 250) selects the link 310, the location tracking services server 240 is configured to provide location data 320 to the electronic device 252, upon successful authentication, as described below. Providing the location data 320 to the electronic device 252 enables the client-side application 254, a browser, or the like resident on the electronic device 252 to generate a display of the geographical location of the selected one of the location providers 220. The location data 320 may be provided to the electronic device 252 in a recurring manner, such that the user of the electronic device 252 (i.e., the location consumer 250) may view the real-time movement of the selected one of the location providers 220.

As mentioned above, the location tracking services server 240 is configured to provide location data 320 to the electronic device 252 associated with the location consumer 250 only after successful authentication. For example, the location service server 240 may authenticate the electronic device 252 using the authentication information (e.g., phone number, caller ID, etc.) gleaned from the authentication information field 425 of the tracking packet 305. This match may be performed so the tracking packet link 310 cannot be passed around. The location owner 210, therefore, exercises complete control over who may view the location of the electronic device 22X associated with the selected one of the location providers 220.

The location tracking services server 240 does the actual tracking of the electronic device 22X associated with the selected one of the location providers 220 (i.e., one of the electronic devices 222, 224 and 226) by any of the various conventional location tracking mechanisms that are well known in the art and sends the location data 320 (e.g., coordinates) determined by the conventional location tracking mechanism to the electronic device 252 associated with the location consumer 250 only as long as the temporary period allows. This prevents private data like the GPS ID of the electronic device 22X associated with the selected one of the location providers 220 (i.e., one of the electronic devices 222, 224 and 226) from being known by the electronic device 252 associated with the location consumer 250.

One example conventional location tracking mechanism to determine the location data 320 is using GPS data 315 received from the electronic device 22X associated with the selected one of the location providers 220 (i.e., one of the electronic devices 222, 224 and 226). For example, each of the electronic devices 222, 224 and 226 may include a GPS receiver (not shown) to determine the location of that electronic device. The on-board GPS receiver of each of the electronic devices 222, 224 and 226 operates in conjunction with the global positioning system (GPS), a space-based satellite navigation system, to generate GPS data 315.

As noted above, either conventional "push" or "pull" communication techniques may be used, in accordance with some embodiments of the present invention, to send the GPS data 315 (or other location data derived from the GPS data) to the location tracking services server 240. A push/pull classification for communication techniques, refers to whether the electronic device "pushes" the GPS data 315 to the location tracking services server 240 without receiving a query for the GPS data or whether the electronic device must be queried, or "pulled", for the GPS data by the location tracking services server 240 before the electronic device will send the GPS data 315 to the location tracking services server 240.

Another example conventional location tracking mechanism to determine the location data 320 is using cell information. For example, the location of the electronic device 22X associated with the selected one of the location providers 220 (i.e., one of the electronic devices 222, 224 and 226) that is utilizing a particular cell tower can be determined within a region of uncertainty based on the physical location of the cell tower, its associated range, and the signal strength. For example, the signal strength of the electronic device 22X measured at one or more cell towers can be used to determine the location (within a region of uncertainty) of the selected one of the location providers 220. The location of the electronic device 22X associated with the selected one of the location providers 220 may, for example, be determined via triangulation (within a region of uncertainty) using the signal strength at three cell towers. In accordance with some embodiments of the present invention that employ this example mechanism, the location tracking services server 240 has access to cell information sufficient to determine the location data 320. For example, the location tracking services server 240 may be coupled to, or otherwise have access to, a location tracking system that generates such cell information (e.g., a wireless provider's cellular network).

In accordance with some embodiments of the present invention, the location service server 240 provides the location data 320 to the electronic device 252 associated with the location consumer 250 only during the temporary period designated by the user of the electronic device 212 (i.e., the location owner 210) in generating and/or editing the tracking packet 305. Once the temporary period expires, the location tracking services server 240 deletes the tracking packet 305 and informs the electronic device 252 associated with the location consumer 250 that access to track the electronic device 22X associated with the selected one of the location providers 220 has been revoked. The location owner 210, therefore, exercises complete control over when the location of the electronic device 22X may be viewed.

The user of the electronic device 212 (i.e., the location owner 210) may, in accordance with some embodiments of the present invention, set the temporary period to commence upon the electronic device 252 associated with the location consumer 250 first accessing the location data 320, set the temporary period to occur during a specifically designated window of time (e.g., 6-7 p.m. of a particular day or set of days), set the temporary period to occur at any other-user specified start and stop time, and/or set the temporary period to "end-upon-meeting". The "end-upon-meeting" termination option ends access to the location data once the electronic device 22X associated with the selected one of the location providers 220 meets (e.g., arrives at the location of or is within a predetermined proximity of) the electronic device 252 associated with the location consumer 250.

It may be desirable to indicate the nature of the temporary period to the user of the location consumer 250. For example, link 310 forwarded to the electronic device 252 may indicate to the user of the electronic device 252 (i.e., the location consumer 250) that the temporary period will commence at a particular time and terminate upon meeting.

In accordance with some embodiments of the present invention, the tracking packet 305 may further include an indication of a landmark to which the selected one of the location providers 220 is travelling. For example, the landmark may be the home of the user of the electronic device 252 (i.e., the location consumer 250). With regard to the exemplary product delivery transaction set forth above, the landmark may be the home of the consumer who purchased the product, or any other delivery destination designated by the consumer. Consequently, the location tracking services server 240, by employing the map data associated with the data base 242, may include the geographical location of the landmark with the location data 320.

A tracking packet link in accordance with some embodiment of the present invention may be received by an Internet-enabled device such as, but not limited to, a mobile phone or a computer. In some embodiments of the present invention, no software or setup is required to receive the tracking packet link and potentially view location of the selected location provider. A location owner may send the tracking packet link to a specific person, several people, or even to a social networking site or group. For example, the location owner may send the tracking packet link to a plurality of location consumers. Consequently, the authentication field of the tracking packet may contain authentication information for each of the plurality of location consumers so that the location tracking services server may authenticate each of the plurality of location consumers. For purposes of brevity hereinafter, the "recipient" may refer to one person or group, or more than one person or group.

The client-side application 214, in accordance with some embodiments of the present invention, may be downloaded onto the electronic device 212 to allow the location owner 210 to share the location of a location provider via a map for a temporary period with any recipient of the location owner's choosing. The location owner 210, through the use of the client-side application 214 in conjunction with operation of the location tracking services server 240, remains in complete control over who may view the location of the location provider, as well as when the location may be viewed.

Figure 5A:
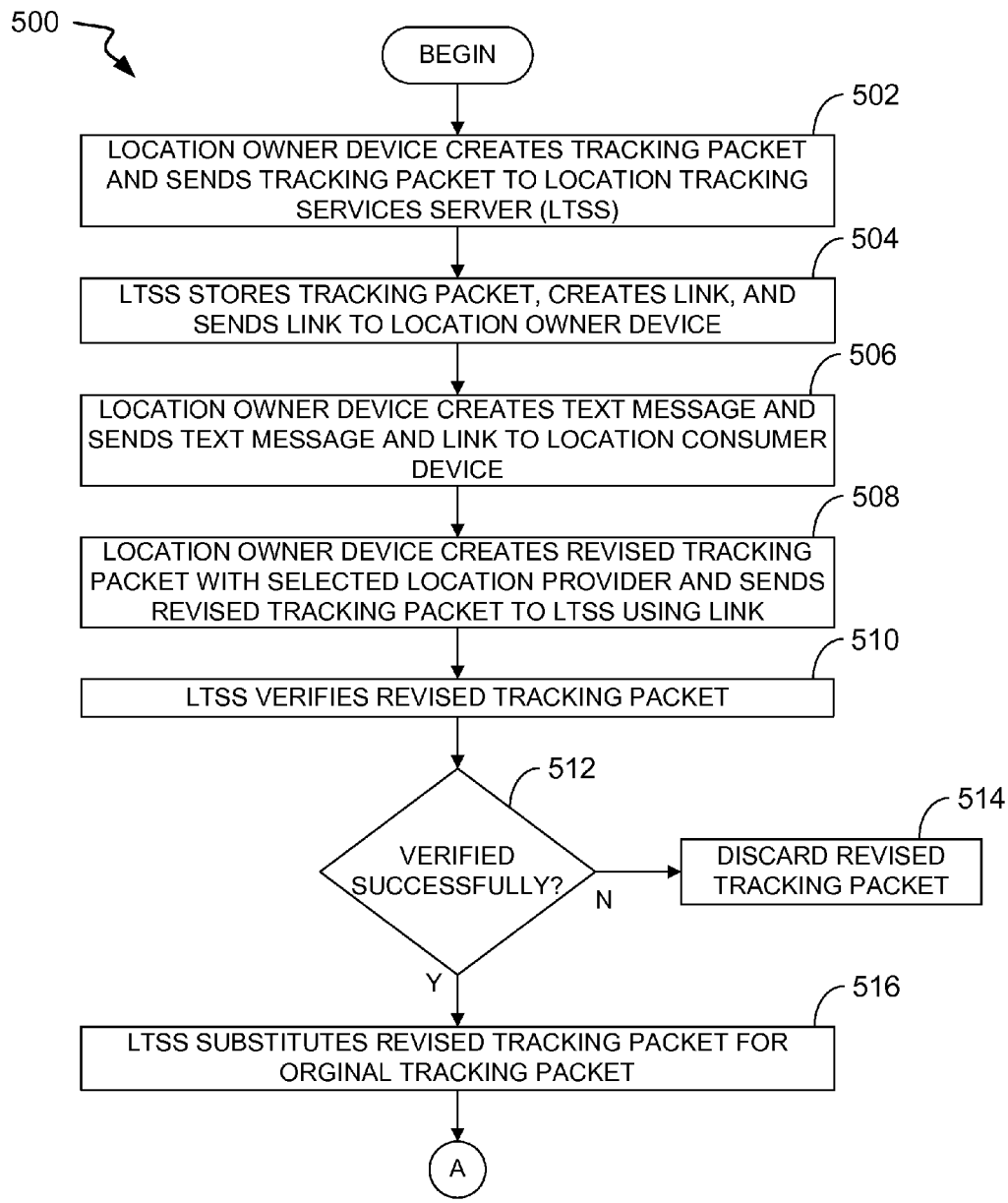
FIGS. 5A and 5B illustrate a flow diagram of a method for temporarily and securely tracking the location of a mobile electronic device in accordance with the some embodiments of the present invention.
Figure 5B:
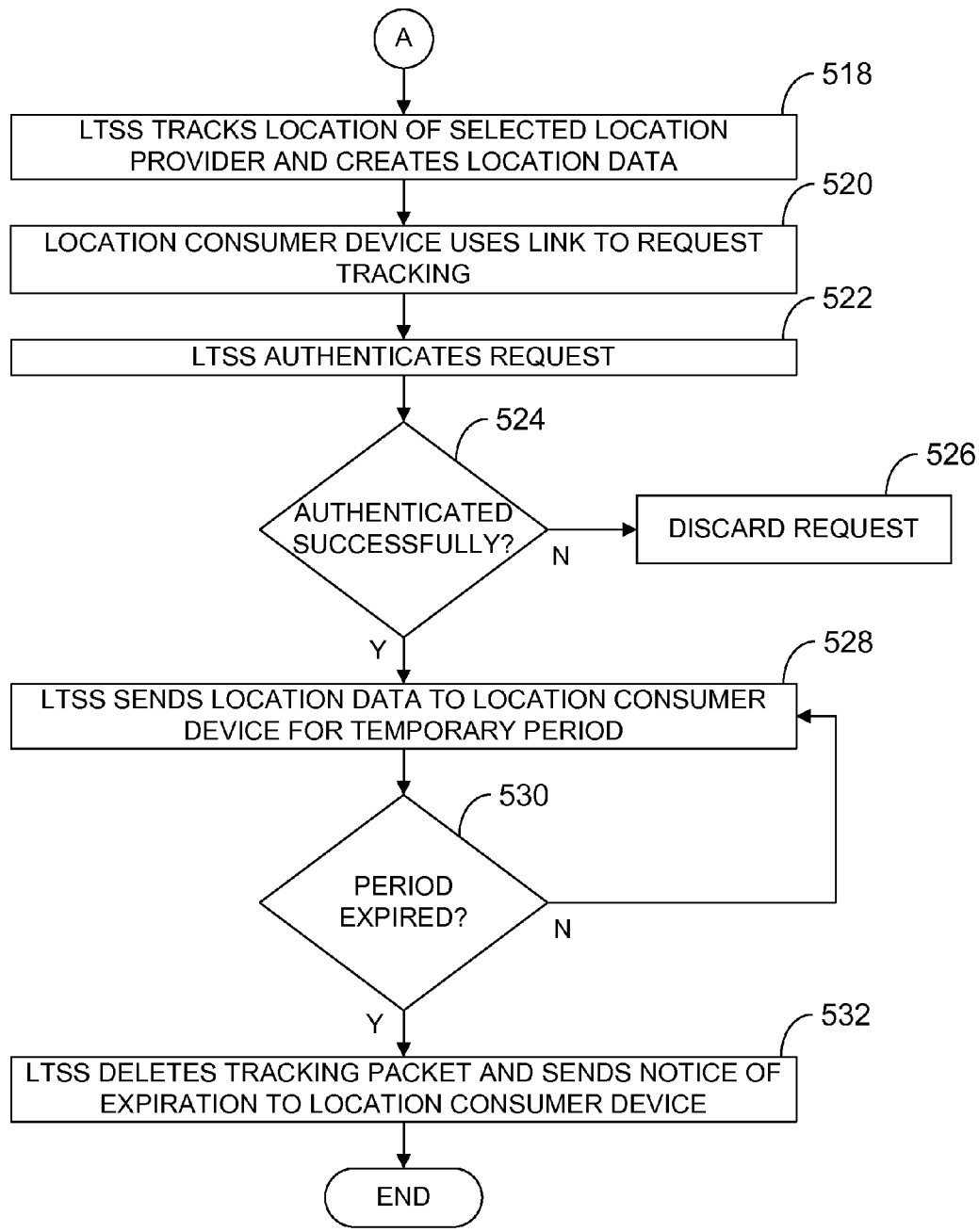

FIGS. 5A and 5B illustrate a flow diagram of a method 500 for temporarily and securely tracking the location of a mobile electronic device in accordance with the some embodiments of the present invention. In the method 500, the steps discussed below (steps 502-532) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The method 500 begins as the electronic device associated with the location owner creates a tracking packet and sends the tracking packet to the location tracking services server (step 502).

Then, the method 500 continues as the location tracking services server stores the tracking packet received from the electronic device associated with the location owner, creates a tracking packet link, and sends the tracking packet link to the electronic device associated with the location owner (step 504).

The method 500 then continues as the electronic device associated with the location owner creates a text message and sends the text message and the tracking packet link received in step 504 to the electronic device associated with the location consumer (step 506).

Then, the method 500 continues as the electronic device associated with the location owner creates a revised tracking packet that incorporates the identity of the electronic device associated with the selected one of the location providers and sends the revised tracking packet to the location tracking services server using the tracking packet link (step 508).

The method 500 then continues as the location tracking services server verifies the revised tracking packet (step 510).

Then, the method 500 continues as the location tracking services server determines whether the revised tracking packet was successfully verified (step 512). If the revised tracking packet was not successfully verified (step 512=No), then the method 500 continues as the location tracking services server discards the revised tracking packet (step 514). If, on the other hand, the revised tracking packet was successfully verified (step 512=Yes), then the method 500 continues as the location tracking services server replaces the original tracking packet stored in step 504 with the revised tracking packet (step 516).

The method 500 then continues as the location tracking services server tracks the location of the electronic device associated with the selected one of the location providers and creates location data (step 518).

Then, the method 500 continues as the location consumer uses the link received in step 506 to request tracking (step 520).

The method 500 then continues as the location tracking services server authenticates the request (step 522).

Then, the method 500 continues as the location tracking services server determines whether the request was successfully authenticated (step 524). If the request was not successfully authenticated (step 524=No), then the method 500 continues as the location tracking services server discards the request (step 526). If, on the other hand, the request was successfully authenticated (step 524=Yes), then the method 500 continues as the location tracking services server sends the location data created in step 518 to the location consumer for the temporary period (step 528).

The method 500 then continues as the location tracking services server determines whether the temporary period has expired (step 530). If the temporary period has not expired (step 530=No), then the method 500 returns to step 528. If, on the other hand, the temporary period has expired (step 530=Yes), then the method 500 continues as the location tracking services server deletes the tracking packet and sends a text message to the electronic device associated with the location consumer informing the location consumer that the temporary period of tracking has expired (step 532).

Exemplary Scenarios:

Exemplary Scenario #1: I order a product for delivery from a goods or services provider using my smart phone while at home, and hang up. Ten minutes later I receive a text message on my smart phone saying "Product is on its way", along with a link. The link provides me the ability to track the location of an electronic device associated with the product delivery person (e.g., a cellular phone carried by the delivery person or a GPS of a GPS-equipped car driven by the delivery person) until the delivery person arrives at my home. In such delayed-sending-of-the-link embodiments, the link may be immediately operable for location tracking purposes. Accordingly, in this example, the text message may only appear on my smart phone after the delivery person has been selected and starts travelling.

In Exemplary Scenario #1 above, the location owner (e.g., one or more employees of the services or goods provider) uses the client-side application to send a tracking packet to the location tracking services server as he/she takes my order. At this point in time, the identity of the delivery person who will be selected to fulfill my order is indeterminate, as is the time at which the selected delivery person will start travelling. The client-side application generates the unique transaction identifier of the tracking packet. As for the various other fields of the tracking packet, the location owner, using the client-side application, may select or otherwise input "unknown" as the locating device identifier information, "unknown" and "end-upon-meeting" as the commencement and termination times of the temporary period information, and my smart phone number as the authentication information. The location owner, in response to sending the tracking packet to the location tracking services server, receives a tracking packet link from the location tracking services server. When the product is ready for delivery, the location owner selects one of the goods or services provider's delivery persons who is then-available to fulfill my order. As the selected delivery person starts travelling to fulfill my order, the location owner, using the tracking packet link and the client-side application, sends a revised version of the tracking packet to the location tracking services server. This revision of the tracking packet by the location owner includes updating the locating device identifier information to identify the electronic device associated with the selected delivery person. This revision of the tracking packet by the location owner also includes updating the temporary period to identify the then-current time as the commencement time of the temporary period. Once the tracking packet is compete (i.e., there are no "unknown" entries in the various fields of the tracking packet), the client-side application may automatically send the text message saying "Product is on its way" to my smart phone, along with the link (i.e., the tracking packet link received from the location tracking services server). Alternatively, once the delivery person has been selected and starts travelling, the location owner may manually send the text message to my smart phone, along with the link.

Exemplary Scenario #2: I order a product for delivery from a goods or services provider using my smart phone while at home, and hang up. I then receive a text message on my smart phone saying "Product will soon be on its way", along with a link. The link provides me the ability to track the location of an electronic device associated with the product delivery person (e.g., a cellular phone carried by the delivery person or a GPS of a GPS-equipped car driven by the delivery person) from the time the delivery person starts traveling until the delivery person arrives at my home. In such immediate-sending-of-the-link embodiments, the link may not be immediately operable for location tracking purposes. Accordingly, in this example, the link is not operable for location tracking purposes until the delivery person has been selected and starts travelling.

In Exemplary Scenario #2 above, the location owner (e.g., one or more employees of the goods or services provider) uses the client-side application to send a tracking packet to the location tracking services server as he/she takes my order. At this point in time, the identity of the delivery person who will be selected to fulfill my order is indeterminate, as is the time at which the selected delivery person will start travelling. The client-side application generates the unique transaction identifier of the tracking packet. As for the various other fields of the tracking packet, the location owner, using the client-side application, may select or otherwise input "unknown" as the locating device identifier information, "unknown" and "end-upon-meeting" as the commencement and termination times of the temporary period information, and my smart phone number as the authentication information. The location owner, in response to sending the tracking packet to the location tracking services server, receives a tracking packet link from the location tracking services server. The client-side application may then automatically send the text message saying "Product will soon be on its way" to my smart phone, along with the link (i.e., the tracking packet link received from the location tracking services server). Alternatively, the location owner may manually send the text message to my smart phone, along with the link. When the product is ready for delivery, the location owner selects one of the goods or services provider's delivery persons who is then-available to fulfill my order. As the selected delivery person starts travelling to fulfill my order, the location owner, using the tracking packet link and the client-side application, sends a revised version of the tracking packet to the location tracking services server. This revision of the tracking packet by the location owner includes updating the locating device identifier information to identify the electronic device associated with the selected delivery person. This revision of the tracking packet by the location owner also includes updating the temporary period to identify the then-current time as the commencement time of the temporary period.

Exemplary Scenario #3: In a variation on Exemplary Scenario #1 and Exemplary Scenario #2, the selected delivery person is assigned to deliver several products in any sequence to multiple customers (Customer_A, Customer_B, and Customer_C) during a single trip from the goods or services provider's place of business. Customer_A, Customer_B and Customer_C are each a location consumer in this example. Each of the multiple customers is a party to a separate transaction with the location owner. Each of these transactions is respectively associated with a unique tracking packet. In this example, the selected delivery person keeps the location owner informed of when delivery occurs for each of the multiple customers. Revision of the tracking packets for the respective multiple customers (each of the multiple customers has a respective tracking packet) may be accomplished either manually by the location owner or automatically using the client-side application. For example, an application may be installed on the electronic device associated with the selected delivery person to send delivery information (e.g., barcode scan data created upon delivery of each box, as described above) to the client-side application of the electronic device associated with the location owner. The client-side application may use this delivery information to automatically revise the tracking packets.

Exemplary Scenario #4: I call to reserve a cab using my smart phone the night before for home pickup to take me to the airport at 5:30 a.m. the next morning. My phone call to reserve the cab ended with a "Track Your Cab" text message, along with a link. The link provides me the ability to start tracking the cab's GPS 30 minutes before my agreed upon pickup time until 30 minutes after that time. In accordance with some embodiments, the text message with the tracking link is delivered immediately, but the link is not active for tracking purposes until later. In accordance with other embodiments, delivery of the text message with the tracking link is delayed until or shortly before the link is active for tracking purposes.

In Exemplary Scenario #4 above, at the time I call to reserve the cab, the cab company may not know which of their several cabs (each GPS-equipped) will be dispatched to pick me up. The location owner (e.g., one or more employees of the cab company) uses the client-side application to send a tracking packet to the location tracking services server as I reserve the cab. The client-side application generates the unique transaction identifier of the tracking packet. As for the various other fields of the tracking packet, the location owner, using the client-side application, may select or otherwise input "unknown" as the locating device identifier information, "5:00 a.m." and "6:00 a.m." as the commencement and termination times of the temporary period information, and my smart phone number as the authentication information. The location owner, in response to sending the tracking packet to the location tracking services server, receives a tracking packet link from the location tracking services server. The client-side application may then automatically send the text message saying "Track Your Cab" to my smart phone, along with the link (i.e., the tracking packet link received from the location tracking services server). Alternatively, the location owner may manually send the text message to my smart phone, along with the link. When a specific cab is dispatched to pick me up (in this example, the dispatched cab is the selected location provider), the location owner, using the tracking packet link and the client-side application, sends a revised version of the tracking packet to the location tracking services server. This revision of the tracking packet by the location owner includes updating the locating device identifier information to identify the GPS ID associated with the dispatched cab's GPS.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A computer-implemented method comprising:
   receiving, at a location tracking services server, a tracking packet from an electronic device associated with a location owner, wherein the location owner is a provider of goods and/or services, wherein the tracking packet includes a locating device identifier information field and a temporary period information field at least one of which contains no data or incomplete data, and wherein the tracking packet includes a unique transaction identifier that uniquely identifies the tracking packet as being associated with one and only one transaction between the location owner and a location consumer;
   sending, from the location tracking services server, a link to the electronic device associated with the location owner, wherein the link includes pointing data that points to the tracking packet;
   receiving, at the location tracking services server, from the electronic device associated with the location owner locating device identifier information that uniquely identifies an electronic device associated with a location provider selected by the location owner to fulfill the transaction, wherein the electronic device associated with the location owner sends the information using the link;
   updating, in the location tracking services server, the locating device identifier information field of the tracking packet to include the locating device identifier information;
   providing to an electronic device associated with the location consumer access to location data contained within the location tracking services server, wherein the location data enables the electronic device associated with the location consumer to display the geographical location of the electronic device associated with the selected location provider, and wherein the access to the location data is accessible to the electronic device associated with the location consumer only for a temporary period defined by the temporary period information field of the tracking packet.

2. The computer-implemented method as recited in claim 1, wherein the tracking packet includes a unique transaction identifier field, locating device identifier information field, a temporary period information field, and an authentication information field.

3. The computer-implemented method as recited in claim 2, wherein the locating device identifier information includes a GPS ID that uniquely identifies the electronic device associated with the selected location provider, and wherein updating the tracking packet to include the locating device identifier information comprises incorporating the GPS ID into the locating device identifier information field of the tracking packet.

4. The computer-implemented method as recited in claim 2, wherein the locating device identifier information includes a cellular phone identifier that uniquely identifies the electronic device associated with the selected location provider, and wherein updating the tracking packet to include the locating device identifier information comprises incorporating the cellular phone identifier into the locating device identifier information field of the tracking packet.

5. The computer-implemented method as recited in claim 1, wherein receiving the locating device identifier information comprises receiving a revised tracking packet from the electronic device associated with the location owner, and wherein updating the tracking packet to include the locating device identifier information comprises replacing the tracking packet with the revised tracking packet.

6. The computer-implemented method as recited in claim 5, further comprising:
verifying the authenticity of the revised tracking packet.

7. The computer-implemented method as recited in claim 1, further comprising sending the link from the electronic device associated with the location owner to the electronic device associated with the location consumer.

8. The computer-implemented method as recited in claim 7, further comprising receiving and authenticating a request to access the location data, wherein the electronic device associated with the location consumer sends the request using the link.

9. The computer-implemented method as recited in claim 1, wherein the temporary period defined by the tracking packet employs an end-upon-meeting termination.

10. A computer-implemented method comprising:
sending a tracking packet from an electronic device associated with a location owner to a location tracking services server, wherein the location owner is a provider of goods and/or services, wherein the tracking packet includes a locating device identifier information field and a temporary period information field at least one of which contains no data or incomplete data, and wherein the tracking packet includes a unique transaction identifier that uniquely identifies the tracking packet as being associated with one and only one transaction between the location owner and a location consumer;
receiving a link from the location tracking services server at the electronic device associated with the location owner, wherein the link includes pointing data that points to the tracking packet;
sending the link from the electronic device associated with the location owner to an electronic device associated with the location consumer;
sending locating device identifier information from the electronic device associated with the location owner to the location tracking services server, wherein the locating device identifier information uniquely identifies an electronic device associated with a location provider selected by the location owner to fulfill the transaction, and wherein the electronic device associated with the location owner sends the locating device identifier information to the location tracking services server using the link.

* * * * *